United States Patent
Baldovino et al.

(10) Patent No.: US 9,096,740 B2
(45) Date of Patent: Aug. 4, 2015

(54) ELASTOMERIC COMPOSITIONS COMPRISING FLUORINATED ADDITIVES AND USE THEREOF FOR THE MANUFACTURE OF DRIVE BELTS

(75) Inventors: Carlo Baldovino, Pescara (IT); Fabio Nardone, San Vito Chietino (IT)

(73) Assignee: DAYCO EUROPE S.R.L. (IT)

( * ) Notice: Subject to any disclaimer, the term of this patent is extended or adjusted under 35 U.S.C. 154(b) by 782 days.

(21) Appl. No.: 13/260,632

(22) PCT Filed: Mar. 26, 2010

(86) PCT No.: PCT/IB2010/000697
§ 371 (c)(1),
(2), (4) Date: Feb. 17, 2012

(87) PCT Pub. No.: WO2010/109321
PCT Pub. Date: Sep. 30, 2010

(65) Prior Publication Data
US 2012/0149510 A1   Jun. 14, 2012

(30) Foreign Application Priority Data
Mar. 27, 2009 (IT) .............................. TO2009A0238

(51) Int. Cl.
*F16G 5/06* (2006.01)
*F16G 5/20* (2006.01)
*C08F 279/02* (2006.01)
*C08F 255/06* (2006.01)
*C08L 51/04* (2006.01)
*C08L 9/00* (2006.01)
*C08F 8/18* (2006.01)
*C08K 5/10* (2006.01)
*C08L 15/00* (2006.01)
*C08L 21/00* (2006.01)
*C08L 23/16* (2006.01)
*C08L 23/28* (2006.01)
*C08L 51/00* (2006.01)
*F16G 1/28* (2006.01)
*C08K 5/14* (2006.01)
*C08L 33/16* (2006.01)

(52) U.S. Cl.
CPC ... *C08L 9/00* (2013.01); *C08F 8/18* (2013.01); *C08F 255/06* (2013.01); *C08F 279/02* (2013.01); *C08K 5/10* (2013.01); *C08L 15/005* (2013.01); *C08L 21/00* (2013.01); *C08L 23/16* (2013.01); *C08L 23/283* (2013.01); *C08L 51/003* (2013.01); *C08L 51/04* (2013.01); *F16G 1/28* (2013.01); *F16G 5/20* (2013.01); *C08K 5/14* (2013.01); *C08L 33/16* (2013.01)

(58) Field of Classification Search
CPC .... C08F 279/00; C08F 279/02; C08F 255/06; C08F 255/04; C08F 8/18; C08L 15/005; C08L 21/00; C08L 23/16; C08L 51/003; C08L 51/04; C08L 9/00; F16G 1/28; F16G 5/20
USPC ......... 474/91, 204, 265; 525/242, 276, 326.1, 525/329.1, 329.3, 331.7, 333.7, 355, 384, 525/386
See application file for complete search history.

(56) References Cited

U.S. PATENT DOCUMENTS

| 4,100,225 A | * | 7/1978 | Mueller ........................ 525/276 |
| 5,141,661 A | * | 8/1992 | DeRosa et al. ................ 508/224 |
| 6,352,488 B1 | | 3/2002 | Morris et al. |
| 7,056,249 B1 | | 6/2006 | Osako et al. |

FOREIGN PATENT DOCUMENTS

| EP | 1881229 A | 1/2008 |
| GB | 1120803 | 7/1968 |
| WO | WO 2009/034422 A | 3/2009 |

* cited by examiner

*Primary Examiner* — Irina S Zemel
*Assistant Examiner* — Jeffrey Lenihan
(74) *Attorney, Agent, or Firm* — Thompson Hine LLP

(57) ABSTRACT

The invention relates to an elastomeric composition comprising a branched polymer obtained from a polymer selected from the group consisting of NBR, HNBR, XHNBR, EP(D)M, and maleized EPDM and from a compound adapted to form a bond at a bond of the polymer to form a side chain. This compound comprises a group Y comprising a perfluoroalkyl functional group and a functional group adapted to react with the double bond. Preferably, $Y=F(CF_2CF_2)_m$ wherein m is in the range between 2 and 20; R is selected from the group consisting of a double bond $C=C$, a triple bond $C\equiv C$, a functional alcoholic, carboxylic, esteric, acrylic, methacrylic group. The invention also relates to the use of a composition as a body compound for a drive belt and to the use thereof in an oil bath.

7 Claims, 3 Drawing Sheets

ELASTOMERIC COMPOSITIONS COMPRISING FLUORINATED ADDITIVES AND USE THEREOF FOR THE MANUFACTURE OF DRIVE BELTS

This application is a 371 of PCT/IB2010/000697 filed on Mar. 26, 2010, published on Sep. 30, 2010 under publication number WO 2010/109321 A and which claims priority benefits to Italian Patent Application No. TO2009 A 000238 filed Mar. 27, 2009, the entire disclosure of which is incorporated herein by reference.

TECHNICAL FIELD

The present invention relates to elastomeric compositions comprising a perfluoroalkyl functional group, and to the use thereof for the manufacture of a drive belt, in particular as a component of the body compound for toothed and poly-V belts. Furthermore, the invention relates to the use of this toothed belt in direct contact with, or partially immersed in, oil.

BACKGROUND ART

The drive belts generally comprise an elastomeric body, in which a plurality of longitudinal filiform resistant inserts, also referred to as "cords", is embedded, and a plurality of teeth coated by a coating fabric. Such teeth may be arranged in a longitudinal direction for multiple race or poly-V belts, or transversally for toothed belts.

Each component of the belt contributes to increasing the performance in terms of mechanical resistance, so as to decrease the risk of failure of the belt and to increase the specific transmissible power.

The coating fabric increases the resistance to abrasion and hence protects the working surface of the belt from wear due to rubbing between the sides and the tops of the belt teeth and the sides and the bottoms of the races of the pulley with which the belt interacts.

Furthermore, the coating fabric reduces the coefficient of friction on the working surface, reduces the deformability of the teeth and especially reinforces the root of the tooth thereby avoiding the failure thereof.

The cords especially contribute to ensuring the required mechanical characteristics for the belt and, in particular, substantially contribute to the modulus of the belt itself ensuring the maintenance of the performance of the belt in the course of time.

The cords are generally formed by twisting high-modulus fibres several times, and are subsequently treated with compounds adapted to increase the compatibility of the fibres with the body compound that surrounds the cords, for instance elastomeric latexes that serve as "adhesives".

Finally, the body compound allows connecting the various elements and must have appropriate hardness and ensure that the various elements forming the belt itself synergically contribute to the final performance of the belt itself.

The known body compounds contain one or more elastomeric materials possibly enriched with fibres to increase the hardness thereof. In particular, a body compound containing copolymers such as hydrogenated acrylonitrile butadiene or HNBR is generally used for toothed belts. For poly-V belts, instead, a common solution in the art consists in the use of a body compound containing a copolymer, (optionally a diene) ethylene-propylene, referred to as EP(D)M.

However, the belts of the prior art have a considerable tendency to break when used in direct contact with lubricating oil, for instance in applications which provide that the belt is in direct contact with oil or immersed, at least partially, in an oil bath.

Currently, many drive systems use gears or chains instead of drive belts, however they are in general more complex to produce and are noisier. Furthermore, the replacement with a belt is desirable as it ensures a greater meshing precision, as well as implying lower costs.

For these reasons, chains and gears are desirably replaced by drive belts without having to carry out any other modification in the drive system as a whole, and therefore, a toothed belt will necessarily operate in contact with oil or even partially immersed in high temperature oil possibly mixed with fuel.

In such conditions, in particular, the body of the belt has a tendency to swell, which is due to the absorption of oil by the elastomeric compound and determines a considerable increase in the frequency of failure.

Patent EP1735543 suggests to improve the behaviour of belts in duration tests imposed by car manufacturers, by using belts the body of which comprises an elastomeric compound formed by a copolymer obtained from a diene monomer and a monomer containing nitrile groups, and which further comprises a fabric coating the working surface of the teeth and which is coated by a resistant elastomeric layer comprising a fluorinated plastomer and a curing agent.

Although encouraging results have been obtained thereby, solutions are continuously sought to increase the chemical-physical compatibility between the different materials forming the different components of the drive belt and between such materials and the environment in which the drive belt works, with the aim of obtaining an appropriate duration of the life of the drive belt.

DISCLOSURE OF INVENTION

Therefore, it is an object of the present invention to obtain a drive belt having a long life and thus having optimum mechanical, adhesion, wear resistance, meshing precision and acoustic emission features, in particular in working conditions in which the drive belt is immersed at least partially in an oil bath, possibly mixed with fuel.

A further object of the present invention is to appropriately select the materials for manufacturing the drive belt, so as to result in the optimum features in the whole working temperature range of the belt.

Another object of the present invention is to optimize the relative chemical compatibility between the different elements that form the drive belt and, especially, to improve the resistance to the lubricating oils of the body of the belt by reducing the swelling tendency.

According to the present invention these objects are achieved by means of an elastomeric composition according to claim 1.

According to the present invention there is also provided the use of this elastomeric composition in the manufacture of a drive belt.

According to another aspect of the present invention, the use is also provided of a belt comprising this elastomeric composition immersed or partially immersed in oil, according to claim 3, which may be a toothed belt or a poly-V belt.

According to another aspect of the invention, there is provided a drive system according to claim 4.

BRIEF DESCRIPTION OF THE DRAWINGS

For a better understanding, the present invention is also described with reference to the accompanying figures, in which.

BEST MODE FOR CARRYING OUT THE INVENTION

Figure 1:
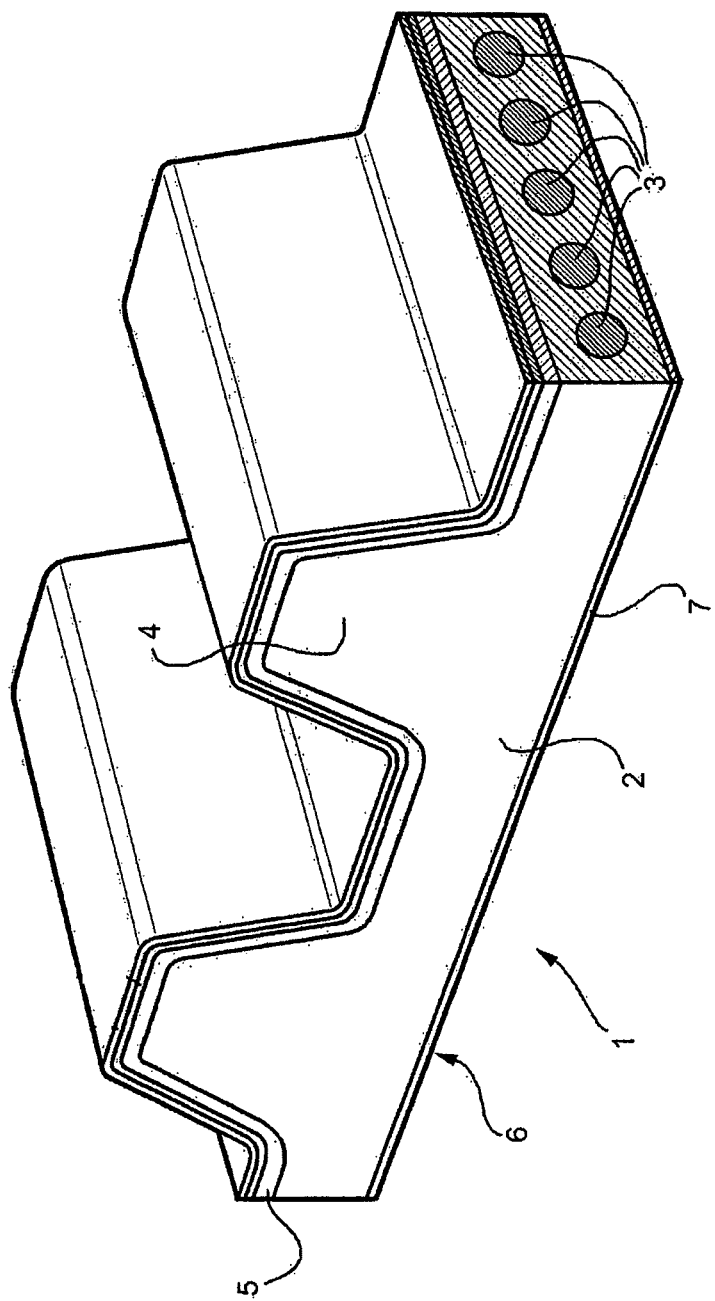
FIG. 1 is a partial perspective view of a toothed belt according to the present invention.

FIG. 1 shows a toothed belt 1 as a whole. Belt 1 comprises a body 2 made of elastomeric material, in which a plurality of longitudinal filiform resistant inserts 3, also referred to as cords, is imbedded. Body 2 has a first face provided with a toothing 4 which is coated by a coating fabric 5 and a second face, or back, 6 of the belt.

Preferably, also back 6 is coated by a fabric 7. Even more preferably fabric 5 that coats toothing 4 is the same as fabric 7 that coats back 6.

Body 2 comprises an elastomeric composition comprising a polymer selected among NBR, HNBR and XHNBR. Preferably, body 2 comprises a composition containing HNBR with a high degree of hydrogenation. Even more preferably, the polymer of the composition has a residual unsaturation degree in the range between 0.5 and 10.

For instance, so-called completely saturated HNBRs, i.e. HNBRs having at most a residual percentage of double bonds of 0.9%, may be used, but as an alternative HNBRs having a lower degree of saturation, such as, for instance, HNBRs having a degree of saturation of 4% or 5.5%, so-called partially saturated HNBRs, may be used.

Some examples of HNBR copolymers that may be used as body compound for toothed belt 1, but also in different treatments of the various components of the toothed belt, are copolymers included in the family of THERBAN produced by Lanxess, such as THERBAN 3407 with 34% of nitrile groups and a degree of hydrogenation of at most 0.9%, THERBAN 3406 with 34% of nitrile groups and a degree of unsaturation of at most 0.9%, THERBAN 3607 with 36% of nitrile groups and a degree of unsaturation of at most 0.9%, THERBAN 3446 with 34% of nitrile groups and a degree of unsaturation of at most 4%, THERBAN 3447 with 34% of nitrile groups and a degree of unsaturation of at most 5.5%, THERBAN 3627 with 36% of nitrile groups and a degree of unsaturation of at most 2%, THERBAN 3629 with 36% of nitrile groups and a degree of unsaturation of at most 2%, THERBAN 3907 with 39% of nitrile groups and a degree of unsaturation of at most 0.9%.

HNBRs produced by Nippon Zeon by the name ZETPOL may also be used as an alternative. Specifically, ZETPOL 2000 with 36% of nitrile groups and a degree of unsaturation of at most 0.9%, ZETPOL 2000L with 36% of nitrile groups and a degree of unsaturation of at most 0.9%, ZETPOL 2010 with 36% of nitrile groups and a degree of unsaturation of at most 4%, ZETPOL 2010L with 36% of nitrile groups and a degree of unsaturation of at most 4%, ZETPOL 2010H with 36% of nitrile groups and a degree of unsaturation of at most 4%, ZETPOL 2020 with 36% of nitrile groups and a degree of unsaturation of at most 5.5%, ZETPOL 2020L with 36% of nitrile groups and a degree of unsaturation of at most 5.5%.

The elastomeric material used for the body of belt 1 may also comprise conventional additives such as, for example, reinforcing agents, fillers, pigments, stearic acid, accelerators, vulcanisation agents, antioxidants, activators, initiators, plasticisers, waxes, pre-vulcanisation inhibitors, anti-degrading agents, process oils and the like.

Advantageously, carbon black may be used as a filler, advantageously added in amounts in the range between 0 and 80 phr, preferably approximately 40 phr. Advantageously, reinforcing white fillers such as talc, calcium carbonate, silica and silicates are preferably added in an amount in the range between 0 and 80 phr, preferably approximately 40 phr. Silanes may also advantageously be used in an amount in the range between 0 and 5 phr.

Advantageously, zinc oxide and magnesium oxide are added in an amount preferably in the range between 0 and 15 phr.

Advantageously, ester plasticisers such as trimellitates or ether esters are added in an amount preferably in the range between 0 and 20 phr.

Vulcanisation coagents such as triallylcyanurates, organic or inorganic methacrylates such as metal salts are advantageously added in an amount preferably in the range between 0 and 20 phr or organic peroxides such as for example isopropyl benzene peroxide in an amount preferably in the range between 0 and 15 phr.

According to an aspect of the present invention, body 2 of toothed belt 1 comprises a polymer composition further comprising a compound comprising at least one $CF_2$ group, preferably a perfluoroalkyl functional group, adapted to form, by means of a chemical reaction, a bond with the chain of the above mentioned polymer to form side chains.

Figure 2:
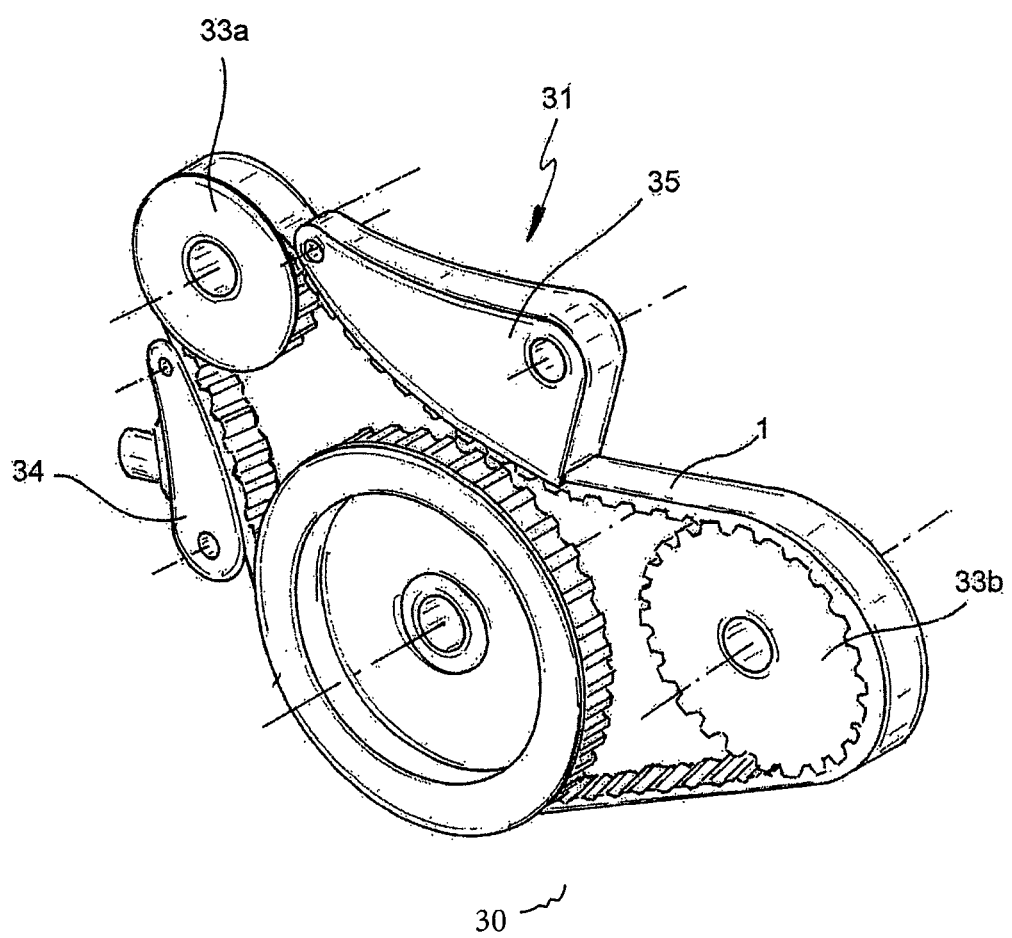
FIG. 2 is a diagram of a first drive system using a first toothed belt according to the present invention.

Belt 1 according to the present invention may be used, for instance, in a drive system of the type shown in FIG. 2. The drive system is indicated in the Figure as a whole by numeral 30 and comprises a driving pulley 31 rigidly fixed to the drive shaft (not shown), a first and a second driven pulley 33a, 33b and a first and second tensioner 34, 35 for the tensioning of the belt.

Figure 3:
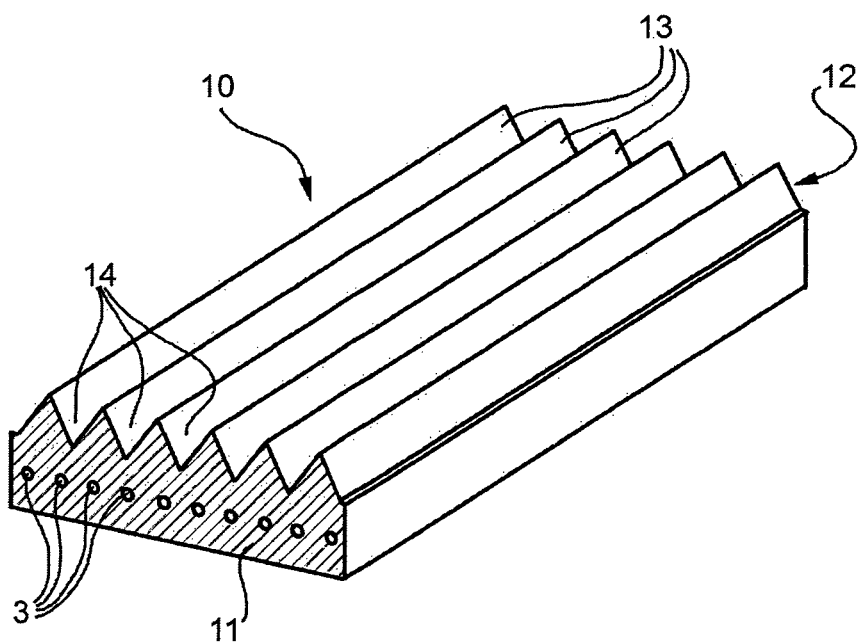
FIG. 3 is a partial perspective view of a poly-V belt according to the present invention.

Alternatively, the elastomeric composition may be used to form a poly-V belt, as shown in FIG. 3 where it is indicated as a whole by numeral 10. Poly-V belt 10 comprises a body 11 made of elastomeric material, a plurality of parallel filiform resistant inserts 3 arranged side by side and embedded longitudinally in body 11, and a coupling portion 12 defined by a plurality of parallel V ribs 13 arranged side by side, extending integrally from body 11 and in a direction longitudinal with respect to the body itself, so as to form V races 14 each comprised between two adjacent ribs 13.

Body 11 comprises an elastomeric composition comprising a polymer selected among EP(D)M and maleized EPDM. Preferably, body 11 comprises a composition containing EPDM.

Advantageously, polymers may be used belonging to the Nordel family of polymers produced by Dow, such as Nordel IP 3720P, Nordel IP 4520, Nordel IP 3745P, Nordel IP 4520, the Buna family of polymers produced by Lanxess such as Buna EP G 6170, Buna EP G 2170, Buna EP T 6250, the Keltan family of polymers produced by DSM such as Keltan® 740, Keltan® 520, and the Vistalon family of polymers produced by Exxon such as Vistalon 706, Vistalon 2727, Vistalon 2504.

According to an aspect of the present invention, body 11 of poly-V belt 10 comprises a polymer composition further comprising a compound comprising a $CF_2$ group, preferably a perfluoroalkyl functional group, adapted to form, by means of a chemical reaction, a bond with the chain of the above mentioned polymer to form side chains.

According to the invention, this compound comprises a group Y comprising a $CF_2$ group, and a group R having a functional group adapted to react with the polymer.

Preferably, this group Y is represented by formula $Y=F(CF_2CF_2)_m$, wherein m is in the range between 2 and 20.

More preferably, m is in the range between 2 and 10. Even more preferably, m is in the range between 2 and 6.

Preferably, the above mentioned group R is selected from the group consisting of a double bond C=C, a triple bond C≡C, a functional alcoholic group, a carboxylic functional group, an ester functional group, an acrylic functional group, a methacrylic functional group.

Even more preferably, the above-mentioned compound is selected from the group consisting of perfluoro-alkyl-methacrylate esters represented by the formula

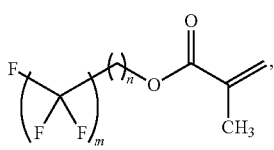
(1)

perfluoro-alkylacrylate esters represented by the formula

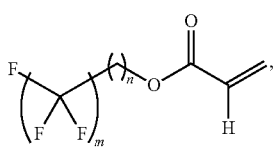
(2)

perfluoro-alkylethylenes represented by the formula

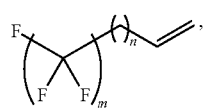
(3)

perfluoro-alkylalcohols represented by the formula

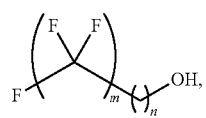
(4)

where m is comprised between 2 and 20. More preferably, m is comprised between 2 and 10. Even more preferably, m is comprised between 2 and 6.

Preferably, n is comprised between 0 and 10, more preferably between 1 and 4.

These compounds combine the presence of a $CF_2$ group, preferably a perfluoroalkyl group, with a portion of the molecule containing a functional group that can interact chemically with a corresponding reactive site present on the chain of the elastomer forming the body compound, for instance with a double bond present in the HNBR polymer chain.

For instance, compounds marketed by Du Pont with the trade mark ZONYL® may be used. More in particular, fluoroalkylacrylates (ZONYL® TA-N) having a boiling temperature in the range between 100 and 220° C., fluoroalkyl-methacrylate (ZONYL® TM) having a boiling temperature in the range between 210 and 350° C., fluoroalkyl olefins (ZONYL® PFBE) having a boiling temperature in the range between 40 and 100° C., for example 58° C., and fluoroalkyl alcohols (ZONYL® BA, BA-L, BA-LD, BA-N) having a boiling temperature in the range between 145 and 245° C., may be used.

Advantageously, the reaction between the fluorinated compounds and the polymer contained in the elastomeric composition of the invention occurs according to a radical mechanism; as an alternative, for example for fluorinated compounds containing a functional alcoholic group, the reaction to form a side chain may be an esterification reaction.

According to an embodiment of the present invention, body 2 of toothed belt 1 comprises an HNBR, NBR, XHNBR polymer functionalised with one of said perfluorinated compounds.

Clearly the compounds comprising a $CF_2$ group may react, for example by a radical or esterification reaction at any point of the polymer chain.

In the preparation of compounds of HNBR, XHNBR, NBR, EPDM, maleized EPDM rubber, organic methacrylate and organic acrylates, as well as metal methacrylates and acrylates are frequently used. The latter are introduced in the compound to increase the crosslinking density of the polymer during the step of vulcanization. These molecules have two or more functional methacrylic or acrylic groups which react, under the influence of radical initiators (organic peroxides), forming covalent bonds with the polymer chain. The crosslinking occurs at typical vulcanization temperatures i.e. generally higher than 140° C. when radical species are generated from the decomposition of the peroxide molecule, that serves as a radical initiator. During this reaction, the methacrylate or acrylate may polymerise on itself and/or on the polymer chain.

The fluorinated and perfluorinated compounds mentioned above and represented by formulas (1), (2), (3) and (4) also have chemically active functional groups such as methacrylates, acrylates, alcoholic groups, olefin double bonds. Like organic and metal methacrylates and acrylates, these compounds can react, possibly under the influence of radical initiators, for example organic peroxides, with the polymer chain, forming stable covalent bonds. As they only have a functional group that can serve as chemically reactive site, however, the course of the reaction preferably leads to the formation of "pendant chains" on the (already formed) main polymer chain, without increasing the degree of crosslinking of the polymer. In the same radical conditions, the fluorinated and perfluorinated compounds mentioned above can also polymerise with themselves forming, on the main polymer, chain pendant chains having a higher molecular weight, or resulting partially dispersed in the compound as discrete units, i.e. units not bound directly to the polymer.

The above said fluorinated and perfluorinated compounds, once bound to the main polymer chain, lead to a considerable increase of polarity in the compound, due to the high dipole generated by the presence of the carbon-fluorine bond, and also provide advantageous properties due to the presence of fluorinated and perfluorinated groups that considerably decrease the surface tension and thus provide the final compound with oil and water-repellent properties, and decrease the friction coefficient.

Advantageously, the fluorinated compounds of the present invention may be used in combination with organic and metal methacrylates and acrylates. This combined use may induce mixed polymerisation between fluorinated methacrylates and acrylates and organic or metal methacrylates and acrylates providing the compound or polymer with mechanical, adhesion, high density crosslinking properties due to the organic and metal acrylates and methacrylates and properties of high polarity, decreased friction coefficient, hydrophobicity, oil repellence.

As an alternative, the polymer contained in the elastomeric composition may be pre-treated with these compounds by carrying out a direct grafting in a radical environment, according to the simplified reaction equation:

Polymer (i.e. HNBR, XHNBR, NBR, EPDM, maleized EPDM)+peroxide+Zonyl TA-N and/or Zonyl TM.

In general, according to the invention, the fluorinated compounds are preferably reacted with the polymer advantageously selected from the group consisting of NBR, HNBR, XHNBR, EP(D)M, maleized EPDM or mixture thereof, more advantageously in a weight ratio comprised for example between 1 and 20 with respect to the overall weight of the compound. More preferably, they are reacted in a weight ratio in the range between 1 and 10 with respect to the overall weight of the compound.

Preferably, the elastomeric compound further comprises reinforcing fibres, more preferably in an amount in the range between 2 and 40 phr, even more preferably 20 phr. The reinforcing fibres advantageously have a length in the range between 0.1 and 10 mm.

The use of fibres allows to further enhance the mechanical characteristics of the body compound.

The reinforcing fibres preferably comprise aromatic polyamides, advantageously paramides, for example Technora© fibres, which may adhere to the compound by means of a resorcinol and formaldehyde latex (RFL) treatment, may advantageously be used.

For example, the latex used may comprise a vinylpyridine-styrene-butadiene copolymer (VP-SBR).

Aramidic fibres have shown to be especially effective, such as for example Teijn's 1 mm-long Technora fibres.

From an analysis of the characteristics of toothed belt 1 and of poly-V chain 10 made according to the present invention, the advantages it allows to obtain are apparent.

The use as a compound forming the body of the belt of an elastomeric composition according to the invention surprisingly allows to prolong the life of the belt and therefore increase the mechanical features, a greater adhesion and a greater resistance to wear.

In particular, the use of this elastomeric composition for manufacturing the body of a drive belt according to the present invention allows to obtain a widening of the lower belt when used in oil with respect to the known compounds.

The drive belt according to the present invention will now also be described by means of examples without because of this being limited thereto.

EXAMPLES

Drive toothed belts have been manufactured by using for the respective body compounds the elastomeric compositions shown in the following tables 1 and 2, where example 1 is a comparative example in which the toothed belt comprises a non functionalised HNBR with the compounds according to the present invention.

TABLE 1

Comparative example 1

| Ingredient | phr |
|---|---|
| Therban 3907 | 100 |
| Perkadox 14-40 | 6 |

TABLE 1-continued

Comparative example 1

| Ingredient | phr |
|---|---|
| ZnO | 4 |
| Elastomag 170 | 3 |
| N-330 | 20 |
| Diplast TM/ST | 10 |
| Saret 633 (metal acrylate) | 10 |

TABLE 2

Example 2 with fluorinated methacrylate with HNBR

| Ingredient | Phr |
|---|---|
| Therban 3907 | 100 |
| Perkadox 14-40 | 6 |
| ZnO | 4 |
| Elastomag 170 | 3 |
| N-330 | 20 |
| Diplast TM/ST | 10 |
| Zonyl TM | 8 |

The belts obtained thereby have been subjected to duration tests in an oil bath.

In particular, the belts of examples 1 and 2 according to the invention have been subjected to duration tests in contact with a mixture containing 90% oil and 10% fuel. For carrying out these tests, the belts have been used on control systems comprising a drive pulley, a driven pulley and a tensioner in which, by means of a tube, the oil/fuel mixture is sprayed directly on the belt. The conditions in which the test has been used are shown in the following table.

TABLE

| Type of belt | Dayco 122 RPP + 150 |
|---|---|
| Speed | 6000 rpm |
| Specific load | 40 N/mm |
| Temperature of the oil/fuel mixture | 140° C. |
| Amount of oil/fuel mixture | 22 l/h |
| Number of teeth of drive pulley | 22 |
| Number of teeth of driven pulley | 44 |
| Tensioner diameter | 47 mm |

The toothed belts subjected to the disclosed test resisted in these conditions at least for 80,000,000 cycles. At the end of the test, the width of the belts was measured and compared with comparison width. The results are shown in the following table:

| | Percentage widening of the belt after the test |
|---|---|
| Belt according to the present invention | 7% |
| Standard belt for application in oil | 10% |

The greater polarity of the compound obtained by introducing fluorinated functional groups results in the belt having a better resistance in the working conditions in direct contact with, or partially immersed in oil. The resistance to mechanical stress is improved accordingly.

The invention claimed is:

1. An oil resistant toothed belt comprising a body and a number of teeth extending from at least one first surface of said body, said teeth being coated with a fabric, said toothed belt being in direct contact with or partially immersed in oil, and said body comprising an elastomeric composition comprising a branched polymer distributed throughout the entire volume of the body of the belt and obtained from a polymer selected from the group consisting of NBR, HNBR, XHNBR, EP(D)M, and maleized EPDM, and from a compound adapted to form, by means of a chemical reaction, a bond with said polymer to form a side chain, the compound comprising a group Y represented by formula $Y=F(CF_2CF_2)_m$ wherein m is in the range between 2 and 20 and a group R, which has a functional group adapted to react with said polymer wherein said group R is selected from the group consisting of a double bond, a triple bond, an alcoholic functional group, a carboxylic functional group, an esteric functional group, an acrylic functional group, and a methacrylic functional group.

2. The toothed belt of claim 1, wherein said compound is selected from the group consisting of perfluoro-alkylmethacrylate esters represented by the formula:

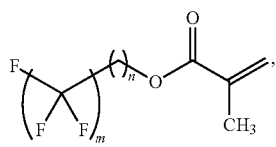

perfluoro-alkylacrylate esters represented by the formula:

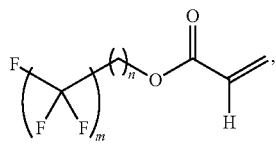

perfluoro-alkylethylenes represented by the formula:

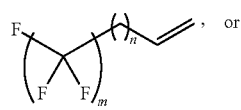

perfluoro-alkylalcohols represented by the formula:

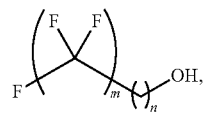

where n is comprised between 0 and 10.

3. A poly-V belt in direct contact with or partially immersed in oil comprising a body comprising an elastomeric composition comprising a branched polymer distributed throughout the entire volume of the body of the belt and obtained from a polymer selected from the group consisting of NBR, HNBR, XHNBR, EP(D)M, and maleized EPDM, and from a compound adapted to form, by means of a chemical reaction, a bond with said polymer to form a side chain, the compound comprising a group Y represented by formula $Y=F(CF_2CF_2)_m$ wherein m is in the range between 2 and 20 and a group R, which has a functional group adapted to react with said polymer wherein said group R is selected from the group consisting of a double bond, a triple bond, an alcoholic functional group, a carboxylic functional group, an esteric functional group, an acrylic functional group, and a methacrylic functional group.

4. A drive system for a motor vehicle comprising at least one drive pulley, one driven pulley, one toothed belt, said toothed belt being in direct contact with or partially immersed in oil, said belt comprising a body and a plurality of teeth extending from at least one surface of said body; said teeth being coated with a fabric; said body comprising an elastomeric composition comprising a branched polymer distributed throughout the entire volume of the body of the belt obtained from a polymer selected from the group consisting of NBR, HNBR, XHNBR, EP(D)M, and maleized EPDM, and from a compound adapted to form, by means of a chemical reaction, a bond with said polymer to form a side chain, the compound comprising a group Y represented by formula $Y=F(CF_2CF_2)_m$ wherein m is in the range between 2 and 20 and a group R, which has a functional group adapted to react with said polymer wherein said group R is selected from the group consisting of a double bond, a triple bond, an alcoholic functional group, a carboxylic functional group, an esteric functional group, an acrylic functional group, and a methacrylic functional group.

5. The poly-V belt of claim 3, wherein said compound is selected from the group consisting of perfluoro-alkylmethacrylate esters represented by the formula:

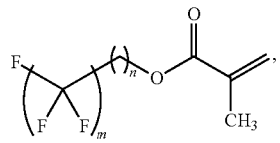

perfluoro-alkylacrylate esters represented by the formula:

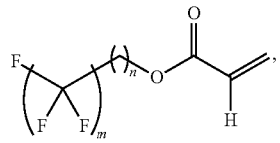

perfluoro-alkylethylenes represented by the formula:

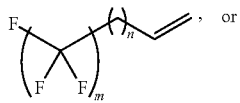

perfluoro-alkylalcohols represented by the formula:

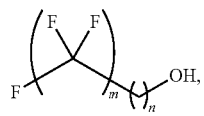

where n is comprised between 0 and 10.

6. The drive system according to claim 4, wherein said compound is selected from the group consisting of perfluoro-alkylmethacrylate esters represented by the formula:

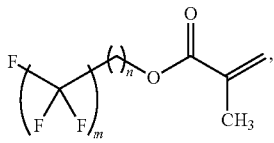

perfluoro-alkylacrylate esters represented by the formula:

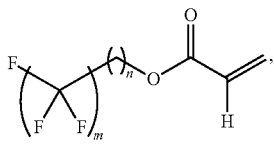

perfluoro-alkylethylenes represented by the formula:

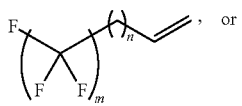, or perfluoro-alkylalcohols represented by the formula:

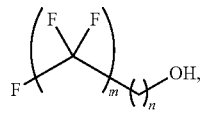

where n is comprised between 0 and 10.

7. A method comprising:
providing a belt comprising an elastomeric composition comprising a branched polymer distributed throughout the entire volume of the body of the belt and obtained from a polymer selected from the group consisting of NBR, HNBR, XHNBR, EP(D)M, and maleized EPDM, and from a compound adapted to form, by means of a chemical reaction, a bond with said polymer to form a side chain, the compound comprising a group Y represented by formula $Y=F(CF_2CF_2)_m$ wherein m is in the range between 2 and 20 and a group R, which has a functional group adapted to react with said polymer, wherein said group R is selected from the group consisting of a double bond, a triple bond, an alcoholic functional group, a carboxylic functional group, an esteric functional group, an acrylic functional group, and a methacrylic functional group; and
placing the toothed belt to-be-in direct contact with oil or at least partially immersing said toothed belt in oil.

* * * * *